United States Patent
Elger

(10) Patent No.: US 9,434,038 B2
(45) Date of Patent: Sep. 6, 2016

(54) SHIFTING MECHANISM FOR A DRILL PRESS

(71) Applicant: Milwaukee Electric Tool Corporation, Brookfield, WI (US)

(72) Inventor: William A. Elger, West Bend, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 9 days.

(21) Appl. No.: 14/524,507

(22) Filed: Oct. 27, 2014

(65) Prior Publication Data

US 2015/0122063 A1  May 7, 2015

Related U.S. Application Data

(60) Provisional application No. 61/898,796, filed on Nov. 1, 2013.

(51) Int. Cl.
| | |
|---|---|
| *F16H 3/08* | (2006.01) |
| *B23Q 5/14* | (2006.01) |
| *F16H 3/091* | (2006.01) |
| *B23Q 5/00* | (2006.01) |

(52) U.S. Cl.
CPC .............. *B23Q 5/142* (2013.01); *F16H 3/091* (2013.01); *B23Q 2005/005* (2013.01); *F16H 2200/0034* (2013.01); *Y10T 74/19219* (2015.01)

(58) Field of Classification Search
CPC ........... F16H 61/0403; F16H 2306/48; F16D 23/025; F16D 23/06; F16D 23/08
USPC ........................................ 74/325, 336 R, 339
See application file for complete search history.

(56) References Cited

U.S. PATENT DOCUMENTS

| | | | | |
|---|---|---|---|---|
| 1,788,701 A * | 1/1931 | Bethune | .................... | F16H 1/08 74/375 |
| 2,475,803 A * | 7/1949 | Probst | .................. | B60K 17/344 74/333 |
| 4,019,400 A * | 4/1977 | Stump | .................... | F16H 3/0915 74/333 |
| 4,125,037 A * | 11/1978 | Palmer | .................. | F16H 37/021 474/28 |
| 5,474,428 A * | 12/1995 | Kimura | ............... | F16H 57/0439 192/48.92 |
| 5,609,540 A * | 3/1997 | Brissenden | ........ | B60K 17/3462 180/248 |
| 5,662,543 A * | 9/1997 | Forsyth | ............. | B60K 17/3462 180/249 |
| 7,798,245 B2 * | 9/2010 | Trautner | ............... | B23B 45/008 173/117 |

OTHER PUBLICATIONS

Dewalt, Parts List for DWD520K Type 2 (2005) 4 pages.
Milwaukee Electric Tool Corporation, Service Parts List, ½" Hammer-Drill, Bulletin 54-24-0380 (2009) 2 pages.

* cited by examiner

*Primary Examiner* — Ha D Ho
(74) *Attorney, Agent, or Firm* — Michael Best & Friedrich LLP

(57) ABSTRACT

A transmission for a power tool includes an intermediate shaft and first and second driving gears coupled for co-rotation with the intermediate shaft. The transmission also includes an output shaft having first and second driven gears continuously engaged with the respective first and second driving gears. The transmission further includes a hub coupled for co-rotation with the output shaft, and a collar. The collar is axially movable along the output shaft between a first position in which the collar couples the first driven gear to the hub for co-rotation with the output shaft, and a second position in which the collar couples the second driven gear to the hub for co-rotation with the output shaft.

20 Claims, 9 Drawing Sheets

US 9,434,038 B2

SHIFTING MECHANISM FOR A DRILL PRESS

CROSS-REFERENCE TO RELATED APPLICATIONS

This application claims priority to U.S. Provisional Patent Application No. 61/898,796 filed on Nov. 1, 2013, the entire content of which is incorporated herein by reference.

FIELD OF THE INVENTION

The present invention relates to power tools, and more specifically to power tool transmissions.

BACKGROUND OF THE INVENTION

Power tool transmissions are often user-configurable to provide different speed outputs of the power tool. For example, an operator of a multi-speed drill press may configure the drill press for high-speed operation or low-speed operation by actuating a switch on the drill press.

SUMMARY OF THE INVENTION

The invention provides, in one aspect, a transmission for a power tool. The transmission includes an intermediate shaft and first and second driving gears coupled for co-rotation with the intermediate shaft. The transmission also includes an output shaft having first and second driven gears continuously engaged with the respective first and second driving gears. The transmission further includes a hub coupled for co-rotation with the output shaft, and a collar. The collar is axially movable along the output shaft between a first position in which the collar couples the first driven gear to the hub for co-rotation with the output shaft, and a second position in which the collar couples the second driven gear to the hub for co-rotation with the output shaft.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
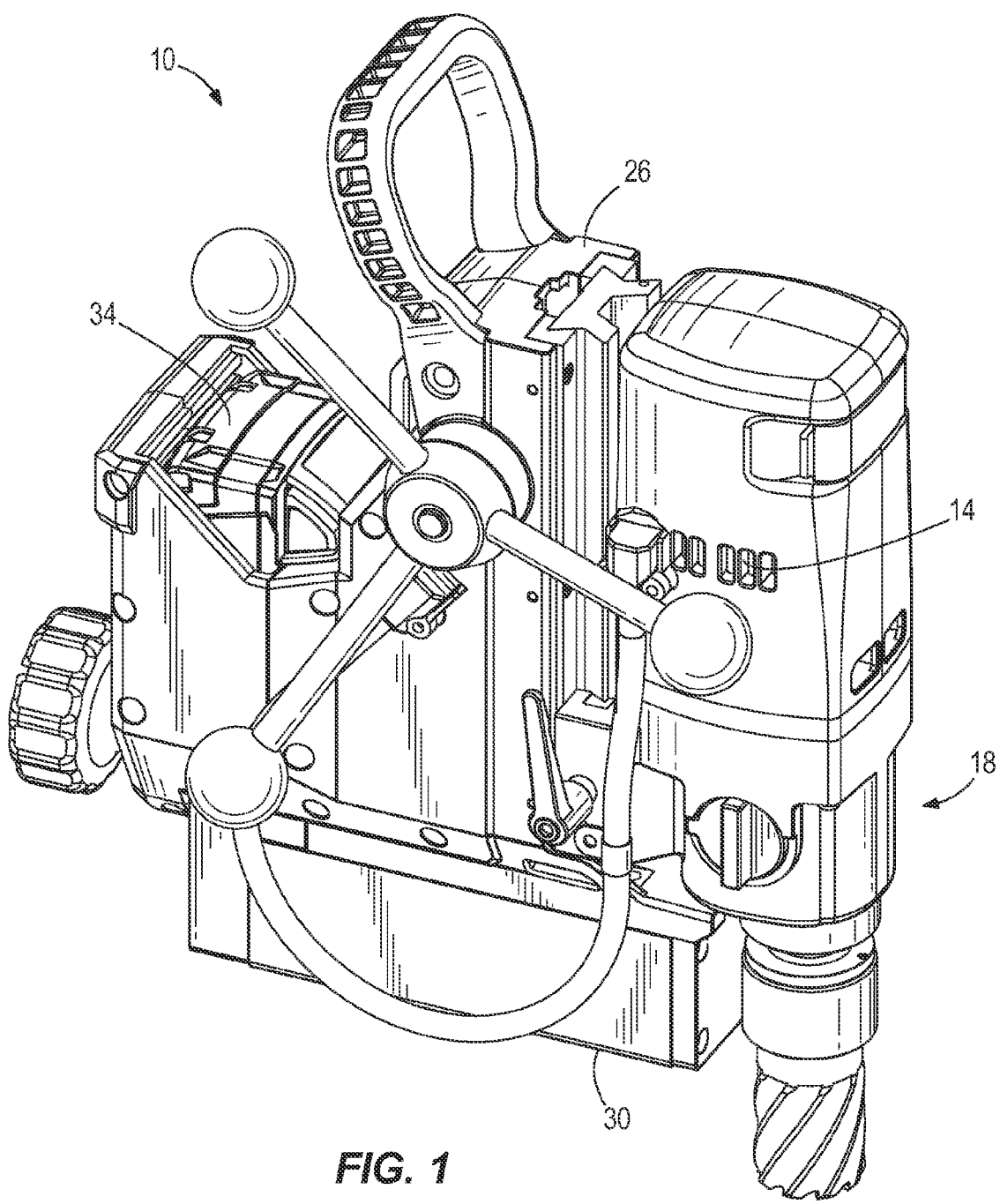
FIG. 1 is a side view of an exemplary power tool.

FIG. 1 illustrates a power tool 10 (e.g., a drill press, etc.) including an electric motor 14 and a transmission 18 (FIG. 2) downstream of the motor 14. An output of the transmission 18 is coupled to an output shaft or spindle 22 which, in turn, may be coupled to a tool chuck or bit retainer in any suitable manner. The power tool 10 (FIG. 1) may include, for example, a stand 26 and a magnetic base 30 for supporting the stand 26 and selectively magnetically latching the power tool 10 to a ferromagnetic workpiece (not shown). The motor 14 may be a DC motor or an AC motor and may be powered by a battery 34 as shown in the illustrated embodiment, from an AC voltage input (i.e., from a wall outlet), or by an alternative DC voltage input (e.g., a DC power supply).

Figure 2:
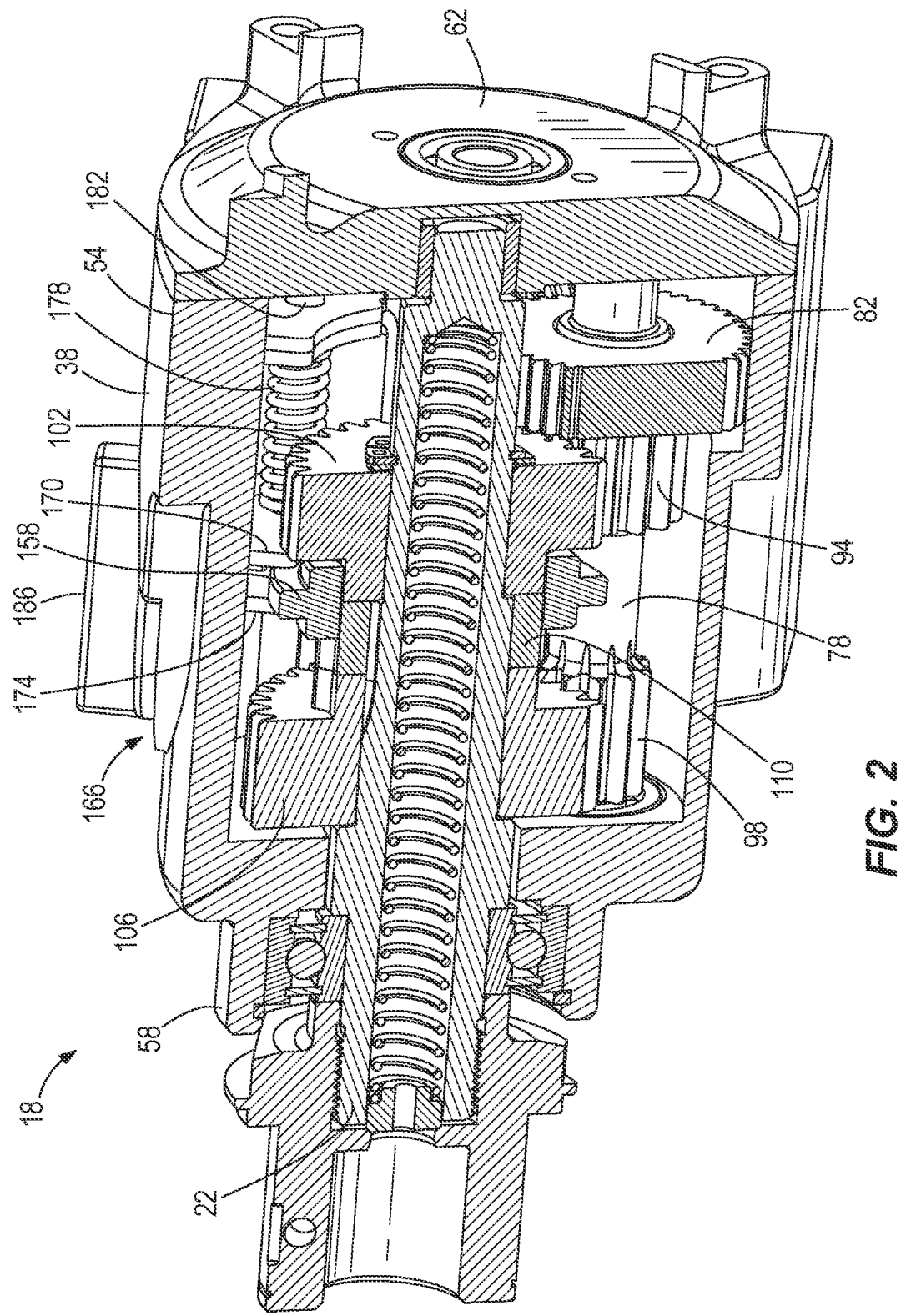
FIG. 2 is a cross-sectional view of a transmission for use in the power tool of FIG. 1.
Figure 3:
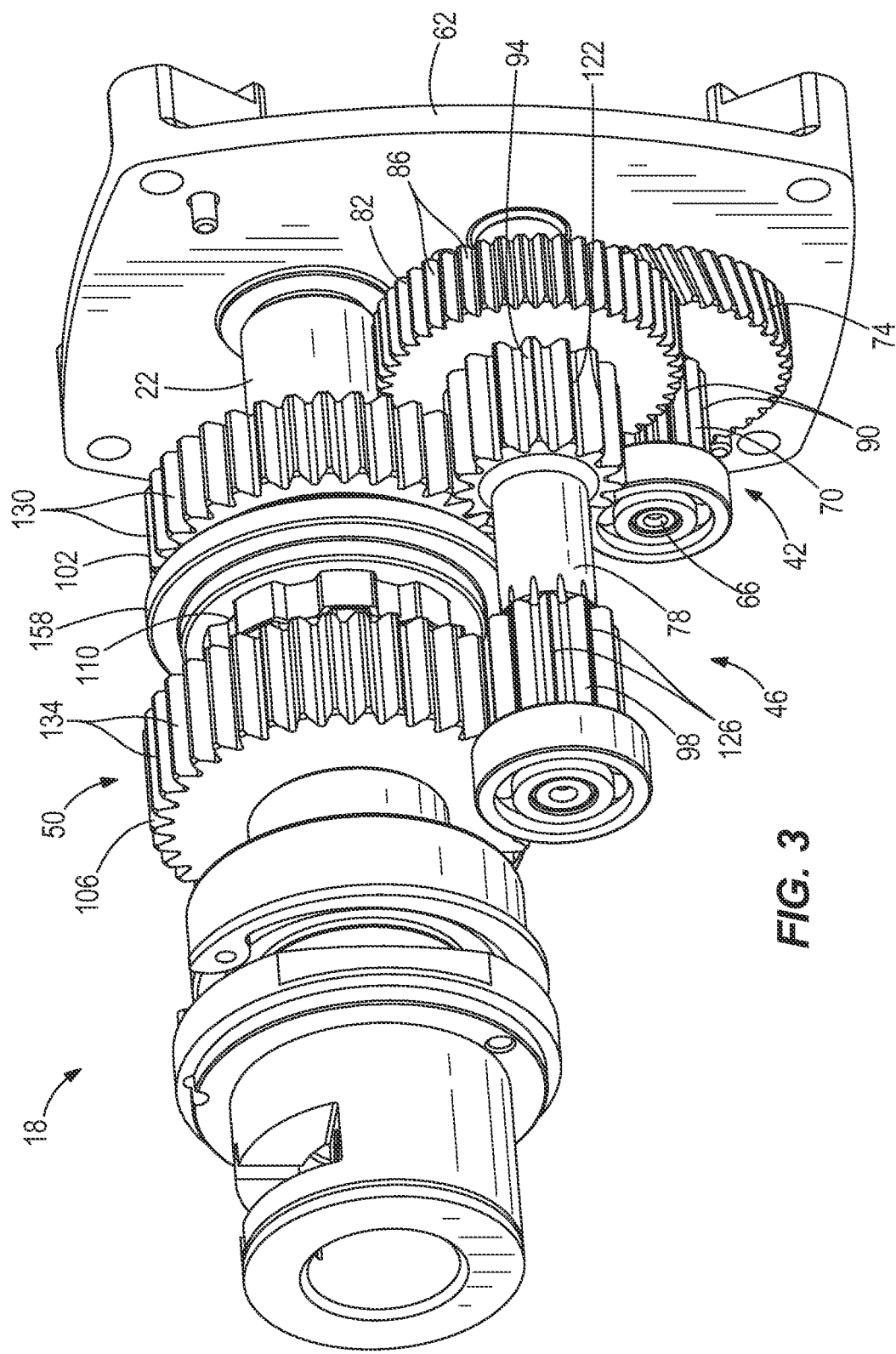
FIG. 3 is a perspective view of the transmission of FIG. 2.

With reference to FIGS. 2 and 3, the transmission 18 includes a transmission housing 38 (FIG. 2) and three gear stages 42, 46, 50, the last of which is coupled to the output shaft 22. The three gear stages 42, 46, 50 are respectively referred to herein as a first gear stage 42, a second gear stage 46, and a third gear stage 50; however, the terms first, second, and third do not imply any spatial or mechanical relationship of the gear stages 42, 46, 50 relative to each other, to the motor 14, or to the output shaft 22. In the illustrated embodiment of the transmission 18, the transmission housing 38 includes a rear housing portion 54 containing therein the three gear stages 42, 46, 50, a front housing portion 58 through which the output shaft 22 extends, and an end cap 62 coupled to the rear housing portion 54. Alternatively, the transmission housing 38 may be divided into any number of portions, or may be configured as a substantially unitary structure. The end cap 62 also provides a mount to which the motor 14 may be coupled.

Figure 4:
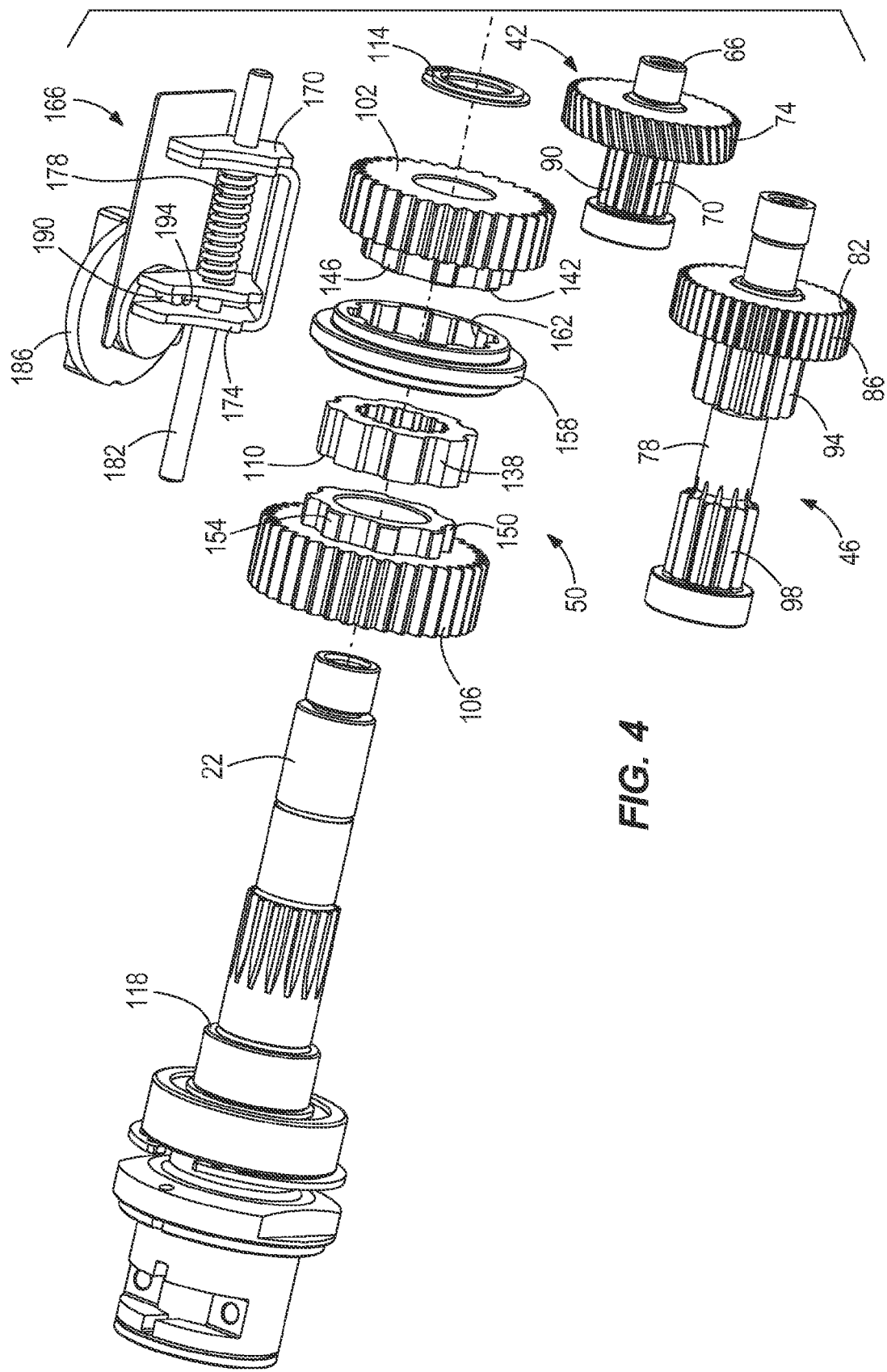
FIG. 4 is an exploded view of the transmission of FIG. 2.

With reference to FIGS. 3 and 4, the first gear stage 42 includes an input shaft 66 and a pinion 70 coupled to the shaft 66 for transmitting torque from the motor 14 to the second gear stage 46. In the illustrated embodiment, the first gear stage 42 further includes a helical gear 74 coupled to the input shaft 66 for receiving torque from an output of the motor 14 and may provide an additional gear reduction between the output of the motor 14 and the first gear stage 42. In other embodiments, any number of additional gear stages, including conventional gear stages, planetary gear stages, and the like, may be included between the first gear stage 42 and the motor 14. Alternatively, the input shaft 66 may be directly coupled to the motor 14.

With continued reference to FIGS. 3 and 4, the second gear stage 46 includes an intermediate shaft 78 and a spur gear 82 coupled for co-rotation with the intermediate shaft 78. The spur gear 82 may be coupled to the intermediate shaft 78 in any of a number of different ways (e.g., by using a key and keyway arrangement, an interference fit, a spline-fit, etc.). The spur gear 82 includes a plurality of teeth 86 meshed with corresponding teeth 90 on the pinion 70 for transmitting torque from the input shaft 66 to the intermediate shaft 78. In the illustrated embodiment, the spur gear 82 has a greater number of teeth 86 than the pinion 70 in order to provide a rotational speed reduction and corresponding torque increase from input shaft 66 to the intermediate shaft 78.

The second gear stage 46 further includes a first driving gear 94 and a second driving gear 98 axially offset from the first driving gear 94. The first and second driving gears 94, 98 may be integrally formed with the intermediate shaft 78 or may be formed separately and coupled to the intermediate shaft 78 for co-rotation therewith in any of a number of different ways.

The third gear stage 50 includes first and second driven gears 102, 106 and a hub 110 supported on the output shaft 22 between the driven gears 102, 106. In the illustrated embodiment, the hub 110 is coupled for co-rotation with the output shaft 22 using a spline-fit, but the hub 110 may be coupled to the output shaft 22 in other ways. The first driven gear 102 is axially fixed on the output shaft 22 between the hub 110 and a snap ring 114 (FIG. 4). The second driven gear 106 is axially fixed on the output shaft 22 between the hub 110 and a shoulder 118 of the output shaft 22. In other words, the hub 110 acts as a spacer between the two driven gears 102, 106. Alternatively, the first and second driven gears 102, 106 may be axially fixed on the output shaft 22 in other ways. The output shaft 22 extends through a cylindrical bore in each of the respective driven gears 102, 106 such that the driven gears 102, 106 are rotatable relative to the output shaft 22.

Referring to FIG. 3, the first and second driving gears 94, 98 each include external teeth 122, 126 that are continuously meshed with external teeth 130, 134 of respective first and second driven gears 102, 106. In the illustrated embodiment, the first driving gear 94 and the first driven gear 102 are sized to provide a first gear reduction and the second driving gear 98 and the second driven gear 106 are sized to provide a second gear reduction greater than the first gear reduction. Accordingly, during operation, the first driven gear 102 rotates at a relatively high speed and low torque, and the second driven gear 106 rotates at a relatively low speed and high torque.

With reference to FIG. 4, the hub 110 includes a plurality of axially-extending, external splines 138. The first driven gear 102 includes splined portion 142 adjacent the hub 110 that has a corresponding plurality of external splines 146. Similarly, the second driven gear 106 also includes a splined portion 150 adjacent the hub 110 that has a corresponding plurality of external splines 154. The transmission 18 further includes a collar 158 having a plurality of internal splines 162 that receive the external splines 138 of the hub 110 to couple the collar 158 for co-rotation with the hub 110. In the illustrated embodiment, the hub 110, the driven gears 102, 106, and the collar 158 are made of powdered metal using a suitable process, such as a compaction and sintering process. Alternatively, one or more of the hub 110, the driven gears 102, 106, and the collar 158 may be made of other materials and by other processes, such as machining, die-casting, and the like. As described in further detail below, the collar 158 is shiftable along the output shaft 22 to selectively interconnect the splines 138 on the hub 110 with the splines 146, 154 of the respective driven gears 102, 106. In the illustrated embodiment, the splines 146, 154 on the driven gears 102, 106 each have a narrower width than the splines 138 on the hub 110. This difference in width may provide clearance to facilitate shifting of the collar 158.

The transmission 18 further includes a shift mechanism 166 operable to move the collar 158 between a first position (FIG. 5), in which the collar 158 engages the splined portion 142 of the first driven gear 102 and the hub 110 to couple the first driven gear 102 and the hub 110 for co-rotation, and a second position (FIG. 8), in which the collar 158 engages the splined portion 150 of the second driven gear 106 and the hub 110 to couple the second driven gear 106 and the hub 110 for co-rotation. In the illustrated embodiment of the transmission 18, the shift mechanism 166 includes a pair of linearly movable, nested brackets 170, 174 for shifting the collar 158 between the first and second positions. A biasing member 178 (e.g., a coil spring) is disposed between the two brackets 170, 174. The brackets 170, 174 and the biasing member 178 are movable together along a rod 182, in response to manual manipulation of an actuator knob 186. The actuator knob 186 includes an eccentric pin 190 that is received within a gap 194 between the shift brackets 170, 174. As such, rotation of the actuator knob 186 causes linear movement of the brackets 170, 174 (and therefore, the collar 158). Alternatively, the shift mechanism 166 may be configured in any of a number of different ways for displacing the collar 158 between the first and second positions.

Operation of the transmission 18 will now be discussed with respect to FIGS. 5-9.

Figure 5:
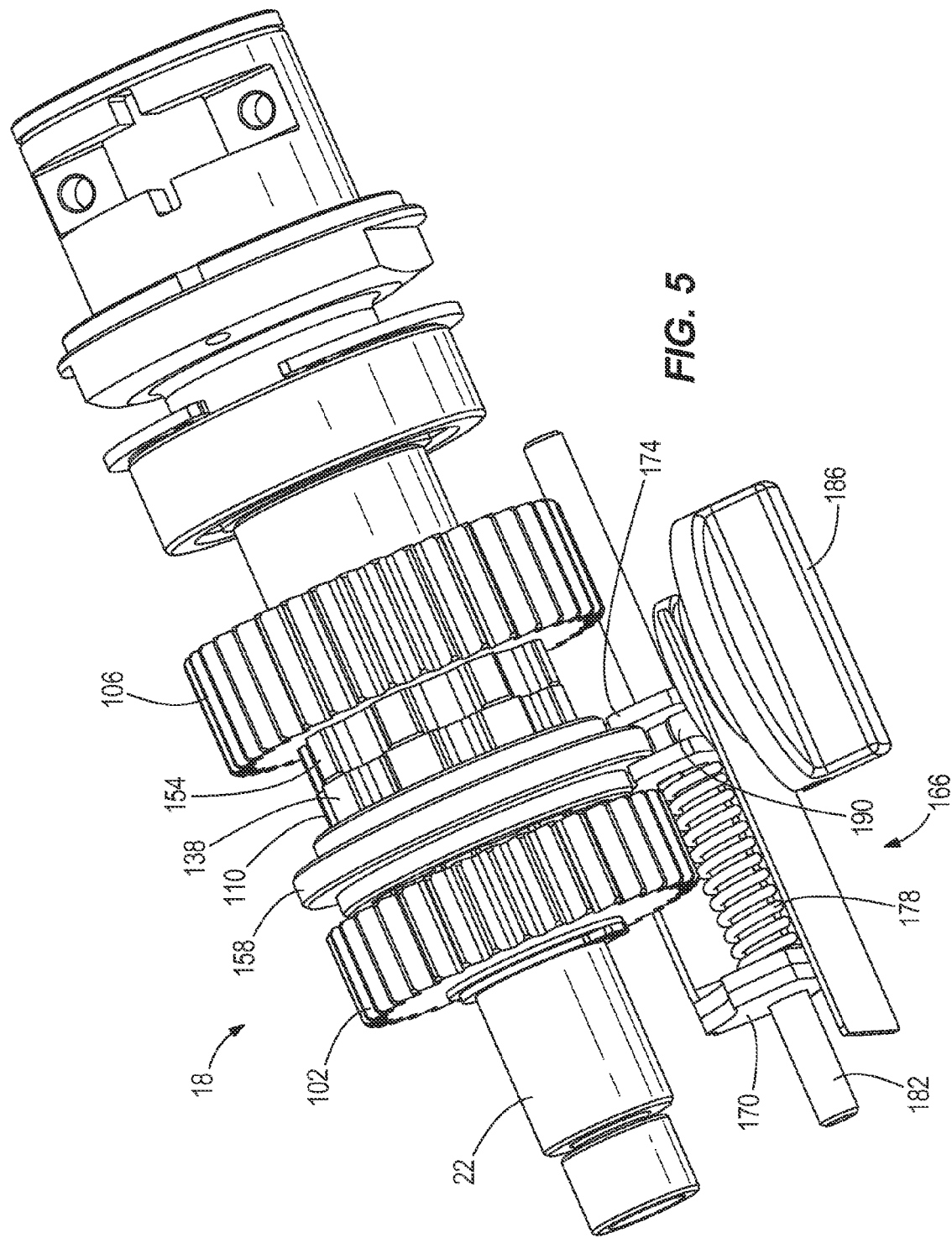
FIG. 5 is a perspective view of the transmission of FIG. 2 with a shifting collar of the transmission in a high speed, low torque position.

FIG. 5 illustrates the transmission 18 configured in a high speed, low torque mode. In this mode, the shift mechanism 166 and the collar 158 are shifted to the first position, thereby coupling the first driven gear 102 to the hub 110 for co-rotation. As such, the output shaft 22, the hub 110, and the first driven gear 102 all co-rotate together at a relatively high speed. Because the second driven gear 106 is continuously meshed with the second driving gear 98 (FIG. 3), the second driven gear 106 continues to rotate at a relatively slow speed (i.e., slower than the rotational speed of the output shaft 22), and the output shaft 22 rotates within the second driven gear 106.

Figure 8:
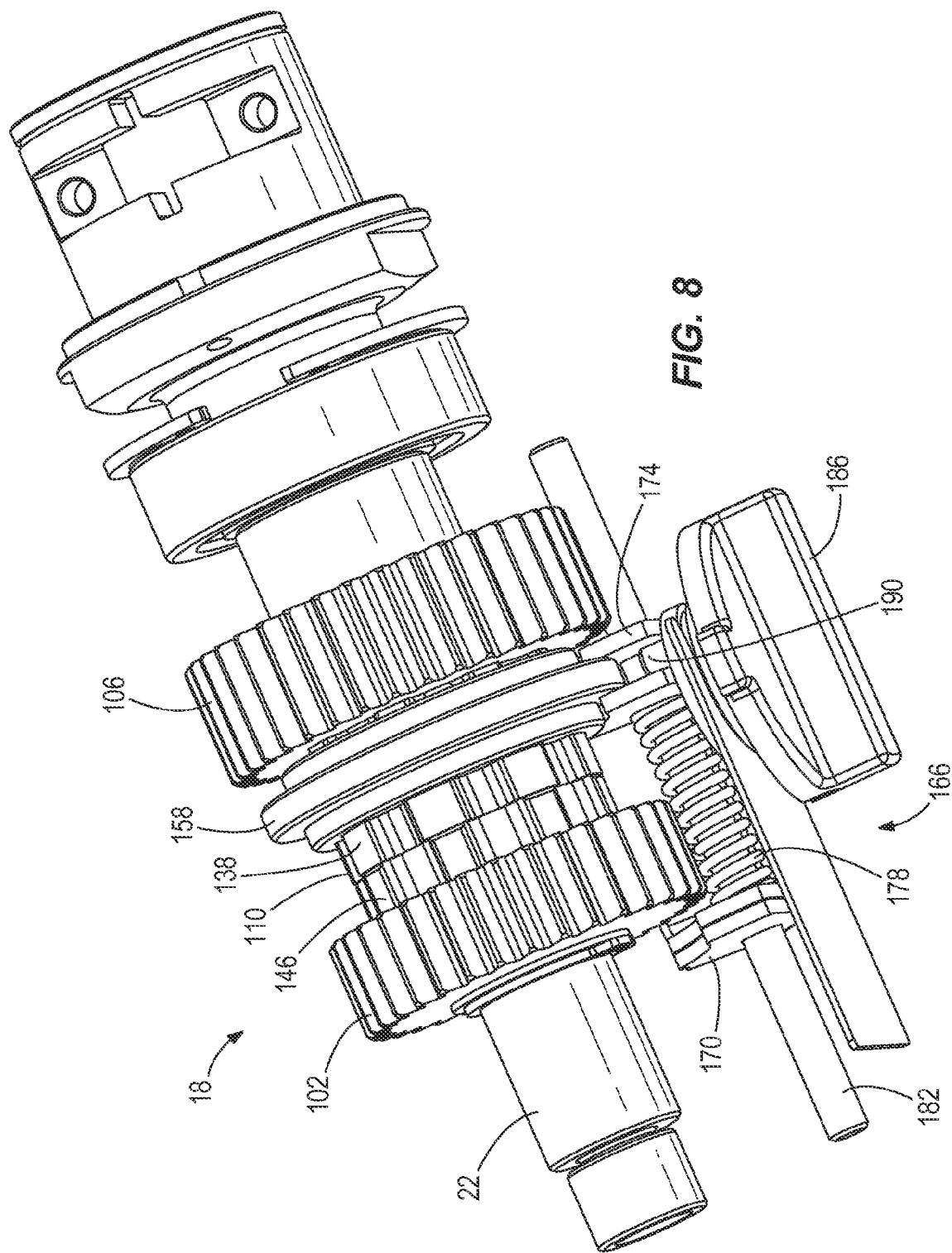
FIG. 8 is a perspective view of the transmission of FIG. 2 with the shifting collar in the low speed, high torque position.

FIG. 8 illustrates the transmission 18 configured in a low speed, high torque mode. In this mode, the shift mechanism 166 and the collar 158 are shifted to the second position, thereby coupling the second driven gear 106 to the hub 110 for co-rotation. As such, the output shaft 22, the hub 110, and the second driven gear 106 all co-rotate together at a relatively low speed. Because the first driven gear 102 remains continuously meshed with the first driving gear 94 (FIG. 3), the first driven gear 102 continues to rotate at a relatively high speed (i.e., faster than the rotational speed of the output shaft 22) and rotates relative to the output shaft 22.

Figure 6:
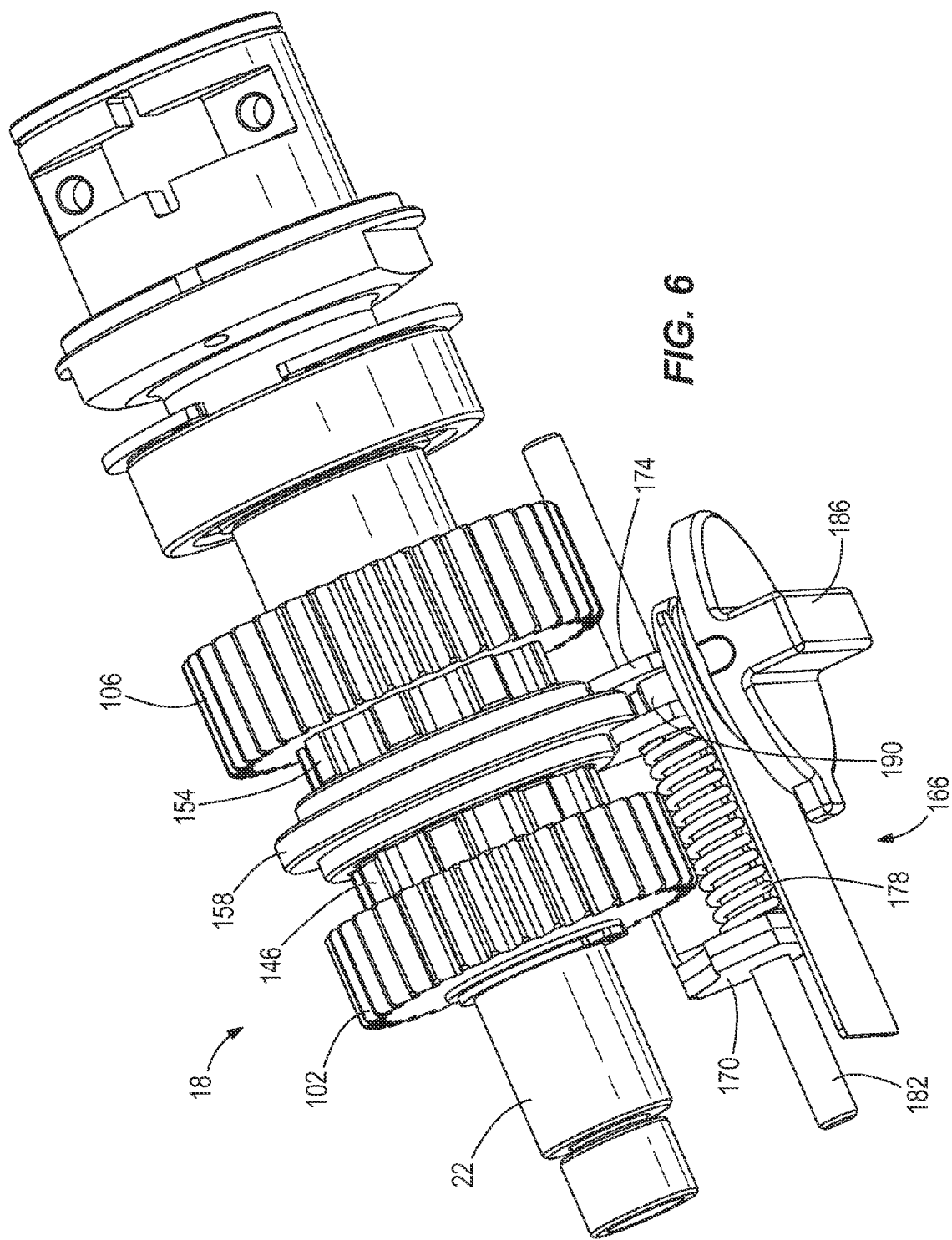
FIG. 6 is a perspective view of the transmission of FIG. 2 with the shifting collar in a neutral position.

To shift the transmission 18 from the high speed, low torque mode (FIG. 5) to the low speed, high torque mode (FIG. 8), a user begins rotating the actuator knob 186. As the actuator knob 186 rotates, the eccentric pin 190 bears against the second bracket 174 which, in turn, pushes against the biasing member 178 to move the first bracket 170 and the collar 158 toward the second position. FIG. 6 illustrates the collar 158 in a neutral position, midway between the first position and the second position. In the neutral position, the collar 158 is disengaged from both the first and second driven gears 102, 106 such that no torque is transferred from the driven gears 102, 106 to the hub 110 (and therefore, the output shaft 22).

Figure 7:
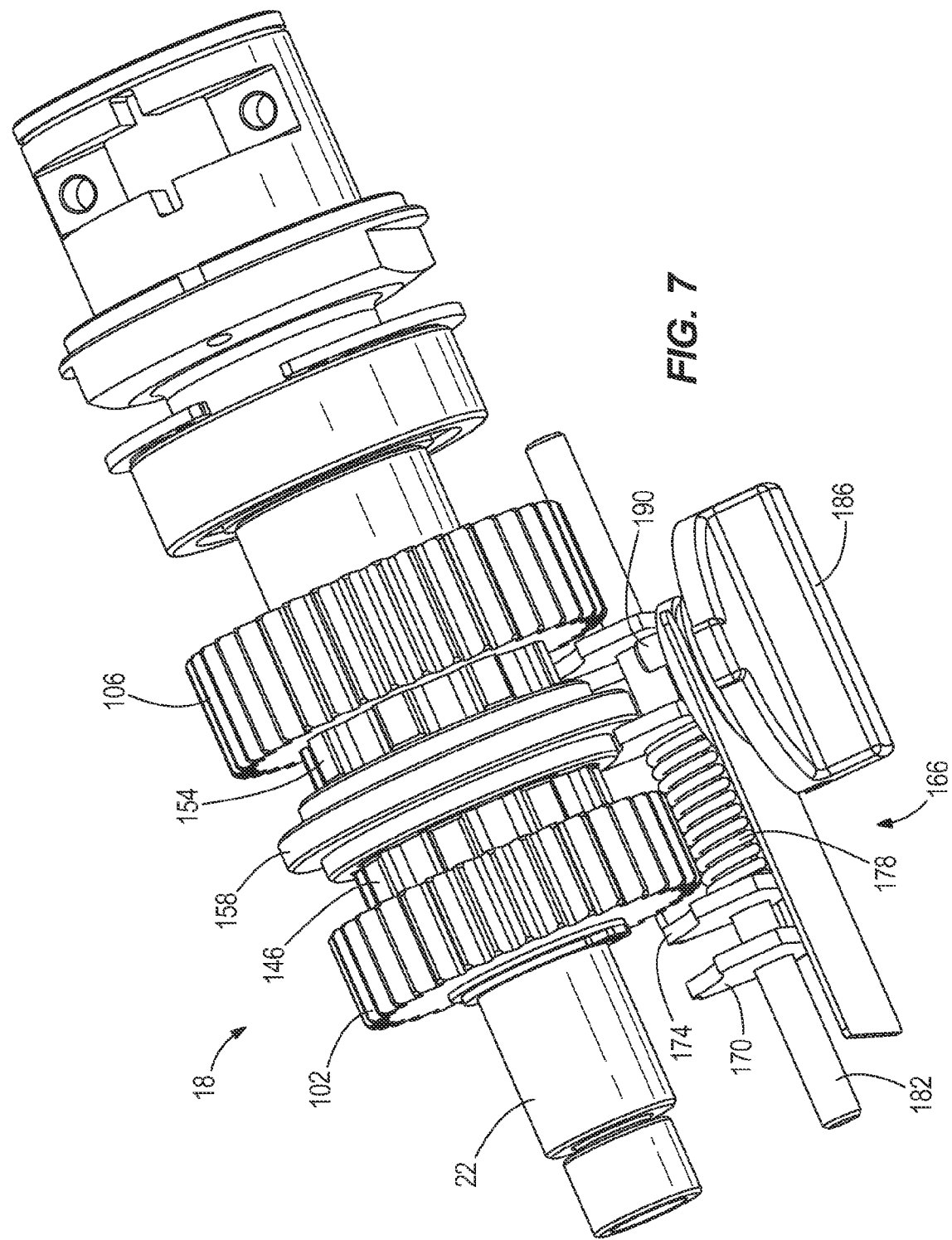
FIG. 7 is a perspective view of the transmission of FIG. 2 with the shifting collar being shifted from the neutral position toward a low speed, high torque position.

If the user continues to rotate the actuator knob 186 and the internal splines 162 of the collar 158 are not yet aligned with the splines 154 of the second driven gear 106, the biasing member 178 is compressed between the brackets 170, 174 (FIG. 7). Once the respective splines 162, 154 are aligned, the biasing member 178 urges the first bracket 170 and the collar 158 into the second position (FIG. 8). Accordingly, the biasing member 178 permits a delay between rotation of the actuator knob 186 and engagement of the collar 158 with the second driven gear 106.

Figure 9:
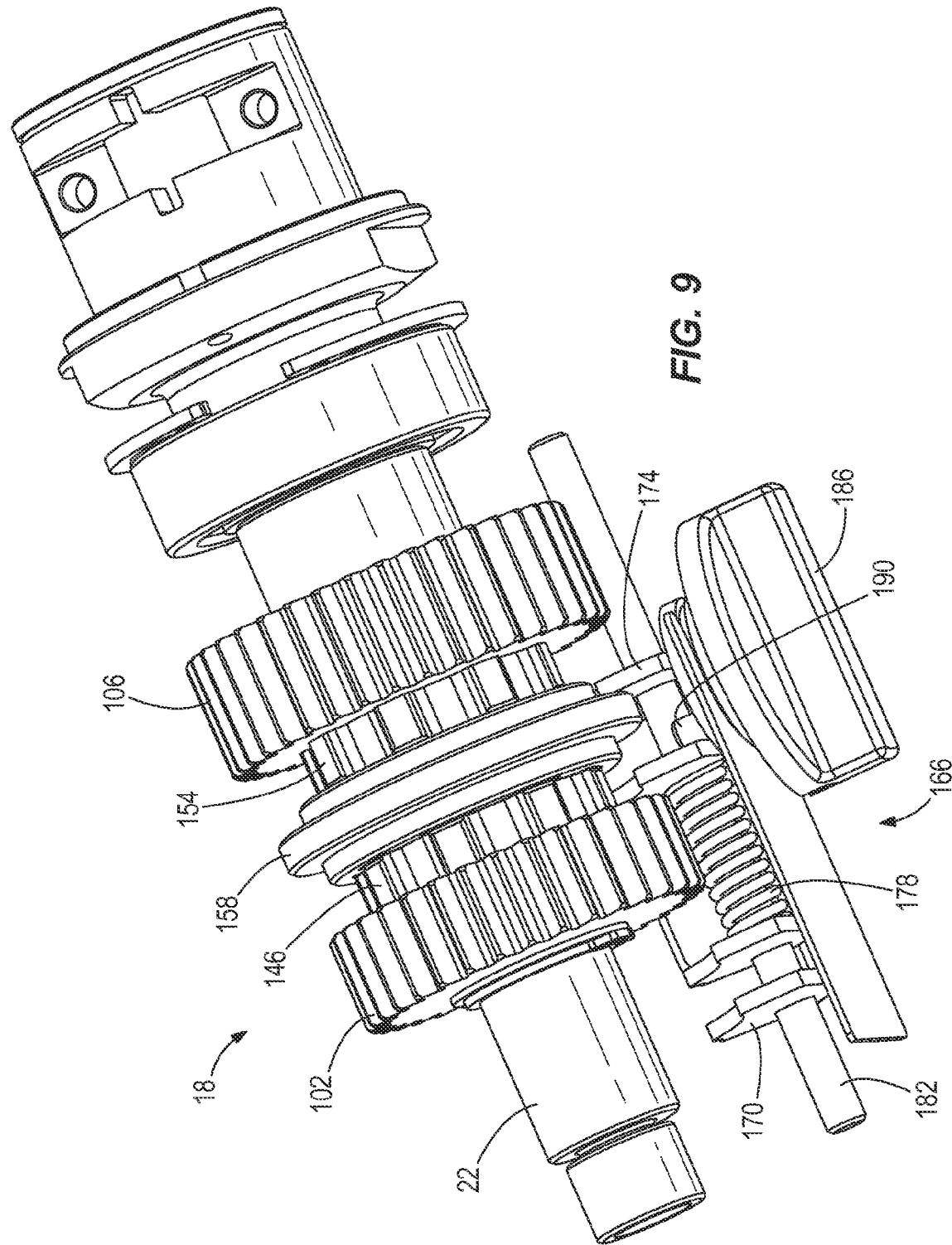
FIG. 9 is a perspective view of the transmission of FIG. 2 with the shifting collar being shifted from the neutral position toward the high speed, low torque position.

To shift the transmission 18 from the low speed, high torque mode (FIG. 8) back to the high speed, low torque mode (FIG. 5), the user begins rotating the actuator knob 186 in the opposite direction. As the actuator knob 186 rotates, the eccentric pin 190 bears against the first bracket 170 which, in turn, pushes against the biasing member 178 to move the second bracket 174 and the collar 158 toward the first position. Once the collar 158 reaches the neutral position (FIG. 6), if the user continues to rotate the actuator knob 186 and the internal splines 162 of the collar 158 are misaligned with the splines 146 of the first driven gear 102, the biasing member 178 is compressed between the brackets 170, 174 (FIG. 9). Once the splines 162, 146 are aligned, the biasing member 178 urges the second bracket 174 and the collar 158 into the first position (FIG. 5). Accordingly, the biasing member 178 permits a delay between rotation of the actuator knob 186 and engagement of the collar 158 with the first driven gear 102.

Various features of the invention are set forth in the following claims.

What is claimed is:

1. A transmission for a power tool, comprising:
   an intermediate shaft;
   first and second driving gears coupled for co-rotation with the intermediate shaft;
   an output shaft having first and second driven gears continuously engaged with the respective first and second driving gears;
   a hub coupled for co-rotation with the output shaft;
   a collar axially movable along the output shaft between a first position in which the collar couples the first driven gear to the hub for co-rotation with the output shaft, and a second position in which the collar couples the second driven gear to the hub for co-rotation with the output shaft; and
   a shift mechanism operable to move the collar along the output shaft between the first position and the second position,
   wherein the shift mechanism includes a first bracket engageable with the collar to move the collar toward the first position, and wherein the shift mechanism includes a second bracket engageable with the collar to move the collar toward the second position.

2. The transmission of claim 1, wherein the shift mechanism includes a rod and an actuator, and wherein the first bracket and the second bracket are slidably coupled to the rod for sliding movement along the rod in response to rotation of the actuator.

3. The transmission of claim 2, wherein the shift mechanism includes a biasing member disposed between the first bracket and the second bracket.

4. The transmission of claim 1, wherein the transmission is operable in a low speed, high torque mode when the collar is moved to the first position.

5. The transmission of claim 1, wherein the transmission is operable in a high speed, low torque mode when the collar is moved to the second position.

6. The transmission of claim 1, wherein the first driven gear includes a first external spline pattern, the second driven gear includes a second external spline pattern, and the hub includes a third external spline pattern.

7. The transmission of claim 6, wherein the collar includes an internal spline pattern configured to selectively receive the first, second, and third external spline patterns.

8. The transmission of claim 1, wherein the hub is disposed between the first and second driven gears on the output shaft.

9. The transmission of claim 1, wherein the first and second driven gears are made of powdered metal.

10. The transmission of claim 1, wherein the hub is made of powdered metal.

11. The transmission of claim 1, wherein the transmission is incorporated in a power tool.

12. The transmission of claim 11, wherein the power tool is a drill press.

13. A transmission for a power tool, comprising:
    an intermediate shaft;
    first and second driving gears coupled for co-rotation with the intermediate shaft;
    an output shaft having first and second driven gears continuously engaged with the respective first and second driving gears;
    a collar axially movable along the output shaft between a first position in which the collar couples the first driven gear to the output shaft for co-rotation with the output shaft, and a second position in which the collar couples the second driven gear to the output shaft for co-rotation with the output shaft;
    a first bracket engageable with the collar to move the collar toward the first position; and
    a second bracket engageable with the collar to move the collar toward the second position.

14. The transmission of claim 13, further comprising a rod and an actuator, wherein the first bracket and the second bracket are slidably coupled to the rod for sliding movement along the rod in response to rotation of the actuator.

15. The transmission of claim 14, further comprising a biasing member disposed between the first bracket and the second bracket.

16. The transmission of claim 13, further comprising a hub coupled for co-rotation with the output shaft, wherein in the first position, the collar couples the first driven gear to the output shaft via the hub, and wherein in the second position, the collar couples the second driven gear to the output shaft via the hub.

17. The transmission of claim 16, wherein the first driven gear includes a first external spline pattern, the second driven gear includes a second external spline pattern, and the hub includes a third external spline pattern.

18. The transmission of claim 17, wherein the collar includes an internal spline pattern configured to selectively receive the first, second, and third external spline patterns.

19. The transmission of claim 16, wherein the hub is disposed between the first and second driven gears on the output shaft.

20. The transmission of claim 16, wherein at least one of the hub, the first driven gear, or the second driven gear is made of powdered metal.

* * * * *